(12) United States Patent
Fegley

(10) Patent No.: US 6,443,475 B1
(45) Date of Patent: Sep. 3, 2002

(54) MOVABLE DRAWBAR CONTROL SYSTEM

(76) Inventor: Clayton F. Fegley, 10801 240th St. NW., Berthold, ND (US) 58718-9719

( * ) Notice: Subject to any disclaimer, the term of this patent is extended or adjusted under 35 U.S.C. 154(b) by 14 days.

(21) Appl. No.: 09/715,441

(22) Filed: Nov. 16, 2000

(51) Int. Cl.$^7$ .................................................. B60D 1/14
(52) U.S. Cl. ........................ 280/468; 280/463; 280/474; 280/499
(58) Field of Search ................................. 280/462, 463, 280/468, 474, 478.1, 498, 499, 515

(56) References Cited

U.S. PATENT DOCUMENTS

| | | | |
|---|---|---|---|
| 1,962,423 A | | 6/1934 | Brown ....................... 280/33.1 |
| 2,600,016 A | | 6/1952 | Miller ...................... 280/33.12 |
| 2,687,900 A | | 8/1954 | Thomas ........................ 280/515 |
| 2,890,896 A | | 6/1959 | Hendrickson ............... 280/467 |
| 2,922,660 A | | 1/1960 | Haugland et al. ........... 280/468 |
| 3,391,948 A | * | 7/1968 | McCown .................... 280/407 |
| 3,398,975 A | * | 8/1968 | Roberts ....................... 280/468 |
| 3,487,448 A | | 12/1969 | Stemmerman et al. ...... 280/468 |
| 3,498,637 A | * | 3/1970 | Lemmon ..................... 280/468 |
| 4,770,436 A | * | 9/1988 | Anderson ................... 280/463 |
| 6,273,449 B1 | * | 8/2001 | Harkcom et al. ......... 280/491.3 |

* cited by examiner

Primary Examiner—J. J. Swann
Assistant Examiner—L. Lum
(74) Attorney, Agent, or Firm—Curtis Harr

(57) ABSTRACT

A movable drawbar control system for use on a typical tractor and specifically on endless track type tractors. The drawbar control system is hydraulically controlled by the user of the tractor via controls in the cab. The system uses a hydraulic cylinder to operate independently movable bar lock flaps. The design of the invention is such that inward and outward motion of the hydraulic cylinder changes the orientation of the bar lock flaps between an engaged vertical position or a disengaged horizontal position. These flaps are used to lock a drawbar into a center position or allow the drawbar to swivel freely from side to side along a pivot bar. Additionally, the bar lock flaps are biased with springs that place a rotation force on them so that they tend toward an engaged or vertical orientation when the hydraulic cylinder is engaged to move them to this position. Thus, if the drawbar is not in the correct position, the flaps may be dropped and the springs will bias the flaps towards the lower position so that as the drawbar moves into the correct position, the flaps will lock the drawbar in a centered or desired position.

19 Claims, 6 Drawing Sheets

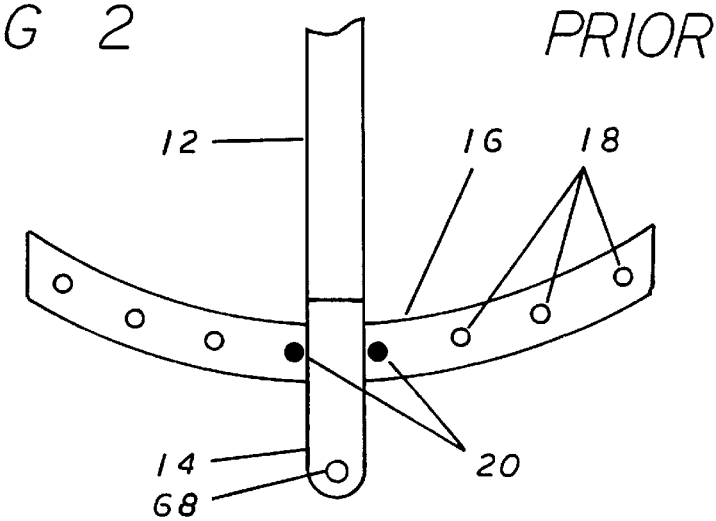
FIG 2  PRIOR ART
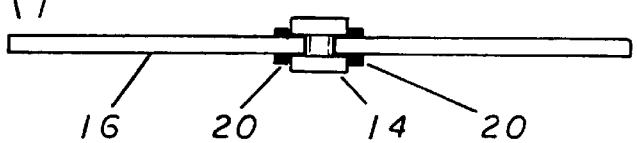
PRIOR ART  FIG 3
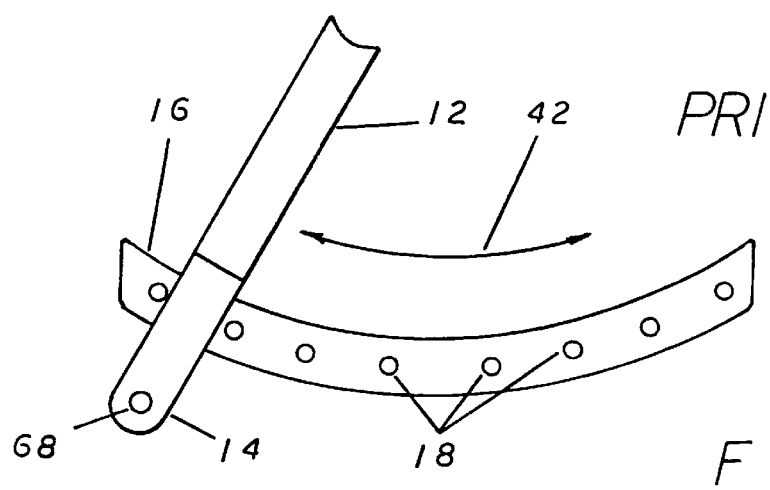
PRIOR ART  FIG 4

MOVABLE DRAWBAR CONTROL SYSTEM

BACKGROUND OF THE INVENTION

The present invention relates to an improvement in a drawbar hitch system for use on utility equipment such as farm tractors. More specifically, to a mechanism to allow for a swinging drawbar component to be conveniently moved between a swinging position and a fixed position depending upon a users needs.

Most current utility vehicles, such as tractors, have a rear hitch or drawbar system whereby a drawbar is used to connect equipment to the tractor. Commonly, this drawbar will be suppled with a half moon slide or straight slide placed at the rear of the vehicle and a series of holes and pins such that the drawbar may be pinned in a particular position or allowed to swivel or slide along the half moon. This may be useful in certain situations, such as hitching up equipment or where a certain amount of pivotal play is needed in the drawbar system for use in pulling a particular implement. The need for a pivotal drawbar may be exemplified in the use of an endless track farm vehicle such as a tractor having a left and right CATERPILLAR system. This type of vehicle is typically steered by slowing or accelerating one or the other tracks in order to move the vehicle either left or right. In this type of situation, the vehicle may make sudden and shart left or right moves depending upon a tracks acceleration or de-acceleration to move the vehicle. This can be particularly troublesome when a fixed drawbar is attached to an implement and the implement mimics these type of movements when traveling down the field. This can make it very difficult for the user to make straight rows or passes with a particular implement down the field. Thus, often times the user will adjust the drawbar mechanism so that it may pivot left or right. This is usually done by removing pins on the slide so that the drawbar can pivot as necessary.

Removal of these pins is currently done manually by getting out of the cab, going to the back when the drawbar is in a particular orientation and removing the pins. This can be very time consuming for the user of the vehicle. Further, when placing the vehicle back in transport mode for travel between fields, the user must get out, place the drawbar in a particular position and replace the pins.

From this discussion it can be seen that it would be desirable to make a system which may easily allow a user of a farm vehicle such as a tractor to switch between a drawbar that is fixed in a given position or pivotable left or right without leaving the cab. Further, it can be seen that it would be advantageous to make the system easily operated from the cab such as through a hydraulic system.

In accordance with this discussion, a moveable drawbar control system is disclosed which allows the user of a farm tractor to switch between a drawbar that is movable from side to side or fixed in a given location, without leaving the cab of the vehicle, simply through the operation of a hydraulic control.

SUMMARY OF THE INVENTION

It is the primary objective of the present invention to provide a method by which a wide variety of equipment can be attached to and pulled by a tractor which will allow for the adjustment of the position of the equipment relative to the tractor.

It is an additional objective of the present invention to provide such a method of attaching and pulling a variety of equipment with a tractor which provides a means of controlling the position of the equipment relative to the tractor either automatically or through the hydraulic control of the operator from his position inside the cab of the farm tractor.

It is a further objective of the present invention to provide such a method of controlling the orientation of equipment that is attached to and pulled by a tractor which can be accomplished within the existing configurations of such tractors and equipment in both an effective and inexpensive manner.

These objectives are accomplished by the use of a moveable drawbar control system. A typical farm tractor is equipped with a rear drawbar which is used to attach implements such as plow bottom or planters to the tractor. The drawbar is typically attached to the frame of the tractor which provides a great deal of strength to the connection which allows for the application of a large amount pulling force. Additionally, the terminal end of the drawbar is equipped with a pin hole so that any implement can be attached by use of the pin system. In a conventional attachment system, the drawbar is held in a specified position in relation to a half moon lock bar by the use of a pair of pins which are positioned within the half moon lock bar on either side of the drawbar. The removal of the lock pins then allows the drawbar to swivel back and forth along the half moon lock bar as the position of the tractor and implement change.

The present invention is designed to make this connection work with any tractor and may be especially useful on endless track type tractors. This special design is necessary because of the skid steer mechanism used to control the direction of the tractor which requires the connection to be moveable during minor directional corrections and held at the center of the lock bar during sharp turns. These operational requirements are fulfilled by the use of the present invention as it can be used to lock the drawbar in a specific location in relation to the lock bar as needed in a given situation, or to allow the drawbar to pivot freely in relation to the lock bar as may be required during use. Additionally, the activation of the present invention can be easily controlled through the tractor's hydraulic system by the operator from inside of the tractor's cab.

The present invention is primarily made up of a relatively long cylinder which contains a plurality of independently rotatable sleeves. These sleeves are the mounting point for the majority of the invention's primary components, the most notable of which are the independently moveable bar lock flaps. The pivotal nature of these components is controlled through the use of an activation hydraulic cylinder which is connected to the pivot cylinder near to its center by the cylinder tab and at its rearward end to the frame of the tractor. The activation of the hydraulic cylinder either forces the tab outward in relation to the cylinder or draws it inward. The design of the invention is such that this inward and outward motion changes the orientation of the bar lock flaps between the engaged or vertical position and the disengaged or horizontal position. This is the mechanism by which the drawbar is either engaged and held in the centered position or disengaged and allowed to pivot freely along the length of the lock bar. Additionally, the bar lock flaps are biased with springs which place a rotation force on them so that they tend towards their engaged or vertical orientation when the hydraulic cylinder is engaged to move them into this position.

Therefore, if the tractor operator desires that the drawbar be allowed to pivot freely within the lock bar during operation, he simply activates the hydraulic cylinder which rotates the bar lock flaps into their disengaged or horizontal position. This moves the flaps out of the path of the drawbar and the drawbar can therefore pivot or slide freely along the lock bar. Conversely, if the operator wishes to lock the drawbar into place he retracts the hydraulic cylinder which allows the spring biased bar lock flaps to rotate back to their engaged or vertical position. The spring biased design of the bar lock flaps is important also in the fact that it allows one of the lock flaps to remain in the horizontal position if the drawbar happens to be in its way at the time of the rotational change. However, once the drawbar has cleared, the flap will then return automatically to the engaged position due to the bias of the spring. This design feature allows the present invention to be operated remotely as it ensures that the drawbar will always be locked into the desired position regardless of its position at the time of hydraulic cylinder deactivation.

For a better understanding of the present invention reference should be made to the drawings and the description in which there are illustrated and described preferred embodiments of the present invention.

DESCRIPTION OF THE DRAWINGS

FIG. 2 is a top elevation view of a typical pivoting hitch mechanism illustrating the orientation of the drawbar in relation to the half moon lock bar when the drawbar has been locked in the center of the lock bar by the use of a pair of locking pins.

FIG. 3 is a front elevation view of a typical pivoting hitch mechanism illustrating the orientation of the drawbar in relation to the half moon lock bar when the drawbar has been locked in the center of the lock bar by the use of a pair of locking pins.

FIG. 4 is a top elevation view of a typical pivoting hitch mechanism illustrating the ability of the drawbar to pivot within the length of the lock bar when the locking pins have been removed.

DESCRIPTION OF THE PREFERRED EMBODIMENT

Figure 1:
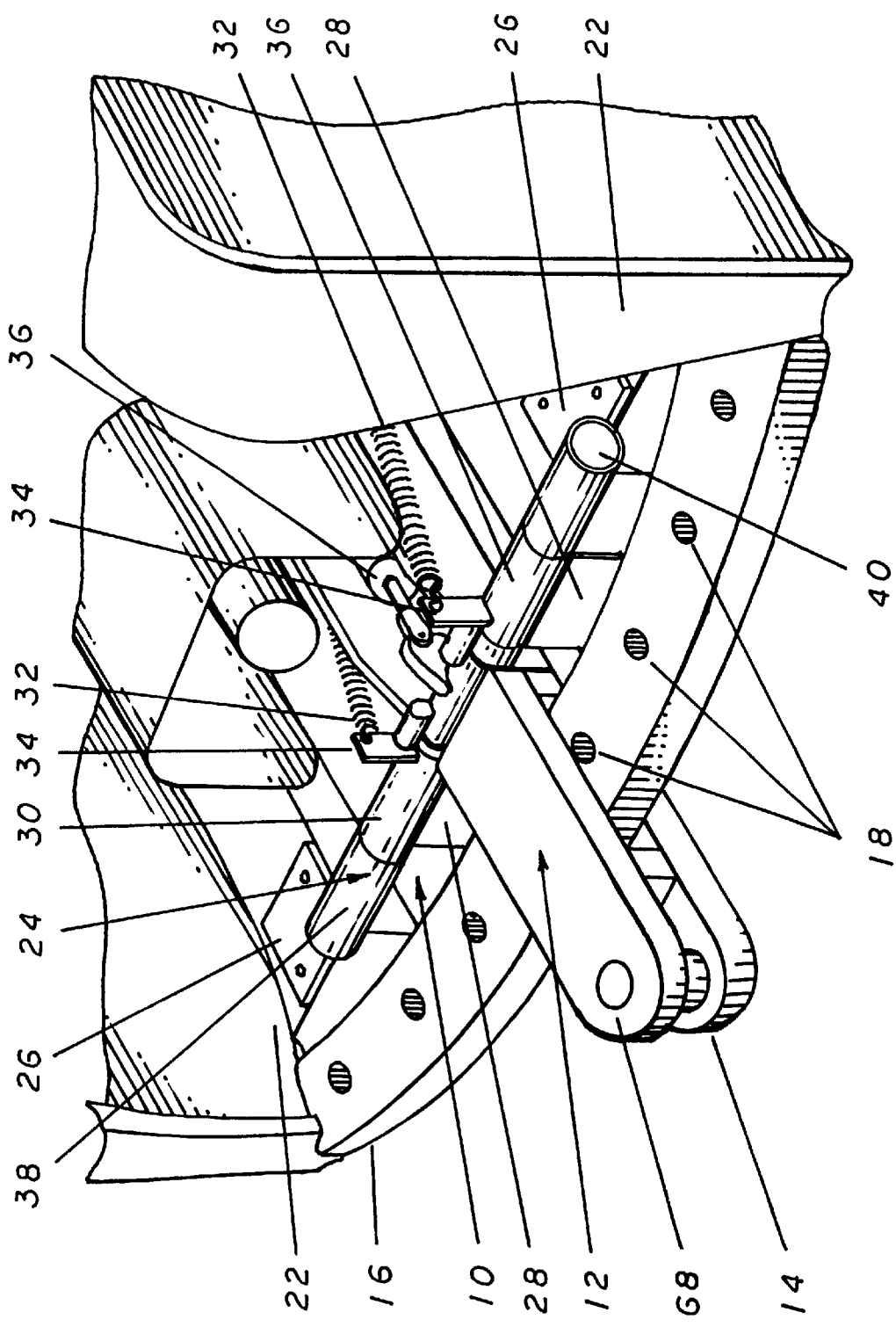
FIG. 1 is a perspective view of the rear most portion of a tractor illustrating the manner of construction of a typical pivoting hitch mechanism that has been fitted with the present invention.

Referring now to the drawings, and more specifically to FIG. 1, the moveable drawbar control system 10 is designed to work in conjunction with a drawbar 12 hitch mechanism that is commonly used with a tractor or wheel vehicle. The drawbar 12 is typically a rearward extending bar-like apparatus that is pivotally mounted to a point on the tractor frame 22 at its forward most end. The rearward end of the drawbar 12 is made up of the drawbar tongue 14 which contains the mount pin 68 that is actually employed to attach an implement to the drawbar 12. The drawbar tongue 14 is made of two relatively short sections of the drawbar 12 that are configured in such a fashion as to leave a gap or space between them. This gap allows the half moon lock bar 16 to pass between the two components of the drawbar tongue 14 which allows the drawbar 12 to pass freely along the length of the half moon lock bar 16 between its outer ends where it is fixedly attached to components of the tractor frame 22. This interlocking design also helps to add horizontal stability to the drawbar 12 as the half moon lock bar 16 aids in supporting the drawbar tongue 14 when the weight of a pulled implement is added to it.

The pivotal nature of a conventional drawbar 12 and the manner in which it interacts with a half moon lock bar 16 are further illustrated in FIGS. 2, 3, and 4. These FIGS. show the construction of the half moon lock bar 16 as being equipped with a plurality of evenly spaced lock pin holes 18 passing through from its upper surface to its lower surface. These lock pin holes 18 provide the points at which lock pins 20 can be inserted to restrict the drawbar pivotal movement 42 in order to maintain the desired orientation of the pulled implement relative to the tractor.

With this purpose, FIGS. 2 and 3 illustrate the use of two lock pins 20 that have been inserted into the lock pin holes 18 of the half moon lock bar 16 on either side of the drawbar 12. This configuration of the lock pins 20 holds the drawbar 12 securely between the lock pins 20 in a position that is desired by the operator of the tractor. This configuration of the drawbar 12 forces the implement being pulled by the tractor to track from a specific point on the rear end of the tractor which provides beneficial tracking characteristics under certain working conditions.

Conversely, FIG. 4 illustrates the relationship between the drawbar 12 and the half moon lock bar 16 when the lock pins 20 have been removed. The removal of the lock pins 20 allows the drawbar 12 to freely pivot along the length of the half moon lock bar 16 (the drawbar pivot movement 42 being described by the directional arrow). This pivoting motion allows the implement being pulled by the tractor to track from a variety of points on the rear end of the tractor which allows the implement to constantly adjust its orientation in relation to the tractor and this provides beneficial tracking characteristics under other specific working conditions.

FIG. 1 also illustrates the position of the present invention in relation to the drawbar 12, the half moon lock bar 16, and the tractor frame 22 when it has been attached to the appropriate position within the tractor. The moveable drawbar control system 10 mounts to the tractor frame 22 just behind the half moon lock bar 16 and passes over the upper surface of the drawbar 12 just behind the drawbar tongue 14. The attachment is made by the use of two attachment flaps 26 which are located on either outside ends of the component pivot cylinder 24 which forms the main body of the invention. The attachment flaps 26 are attached to the component pivot cylinder 24 by means of the attachment flap sleeves 38 which are pivotally mounted to the component pivot cylinder 24. This pivotal attachment of the attachment flap sleeves 38 allows the remainder of the component pivot cylinder 24 to move independently through the pivot cylinder core 40 of the attachment which is critical to the operation of the present invention.

Figure 5:
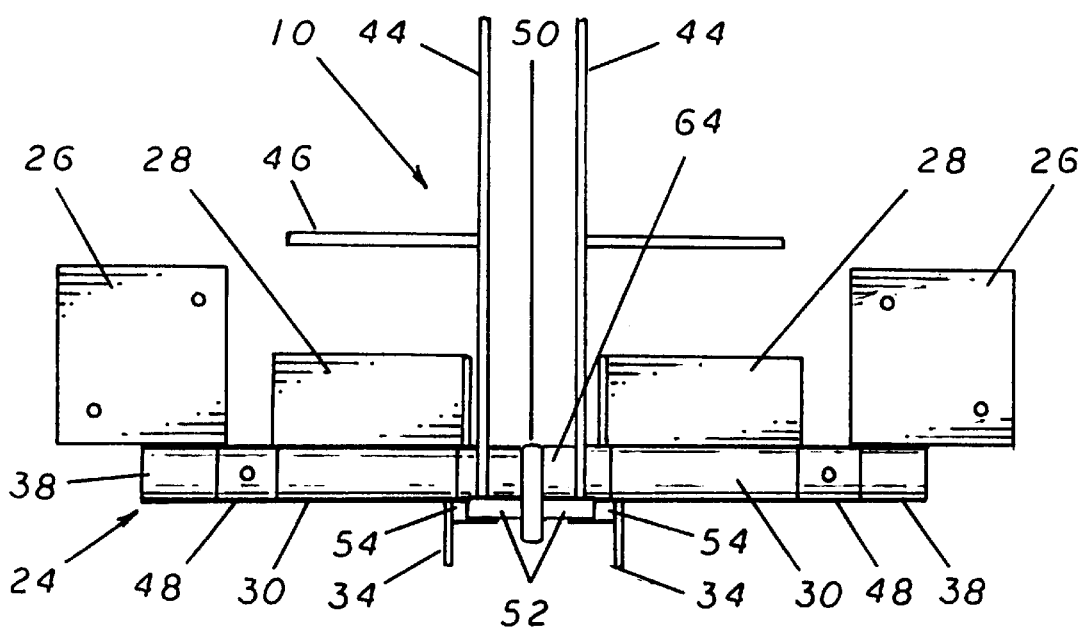
FIG. 5 is a top elevation view of the present invention illustrating the orientation of the drawbar lock flaps in relation to the pivot cylinder and the other remaining components of the invention.
Figure 6:
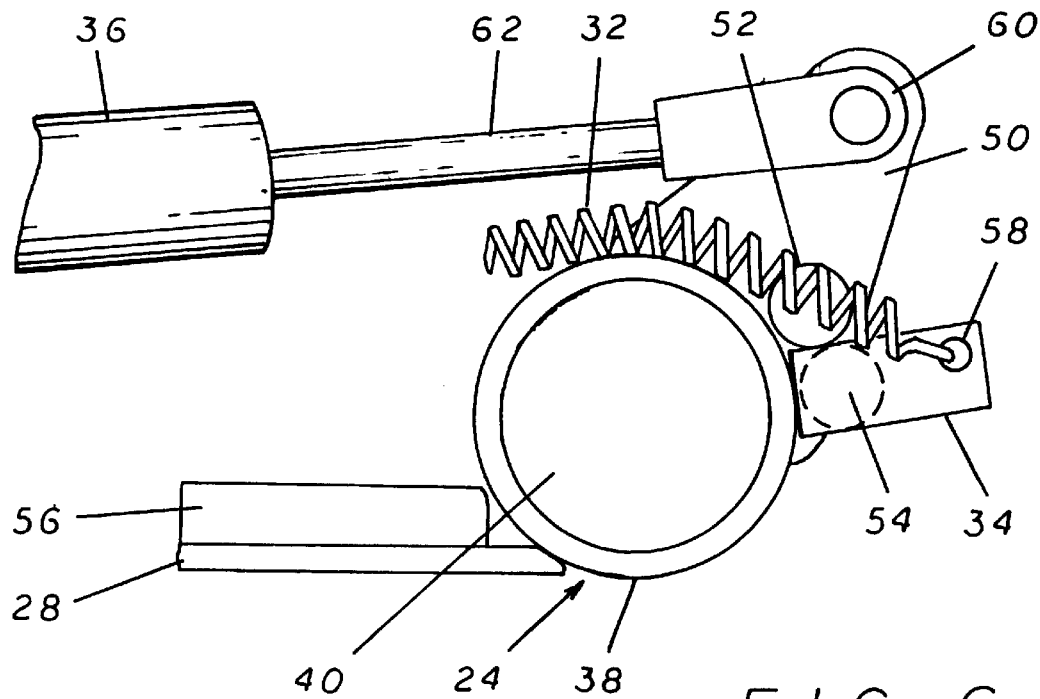
FIG. 6 is a side elevation view of the present invention which illustrates the manner in which a hydraulic cylinder is used to force the cylinder tab forward which in turn rotates the pivot cylinder and the drawbar lock flaps up and out of the way of the drawbar.
Figure 7:
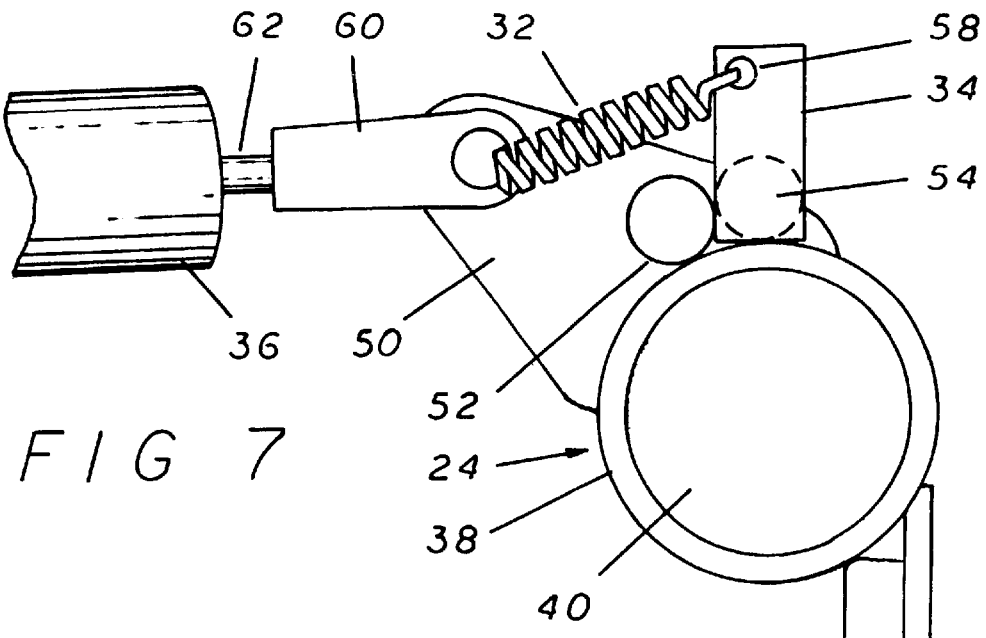
FIG. 7 is a side elevation view of the present invention which illustrates the manner in which a hydraulic cylinder is used to pull the cylinder tab backward which in turn rotates the pivot cylinder and the drawbar lock flaps down so that it may engage the drawbar.
Figure 8:
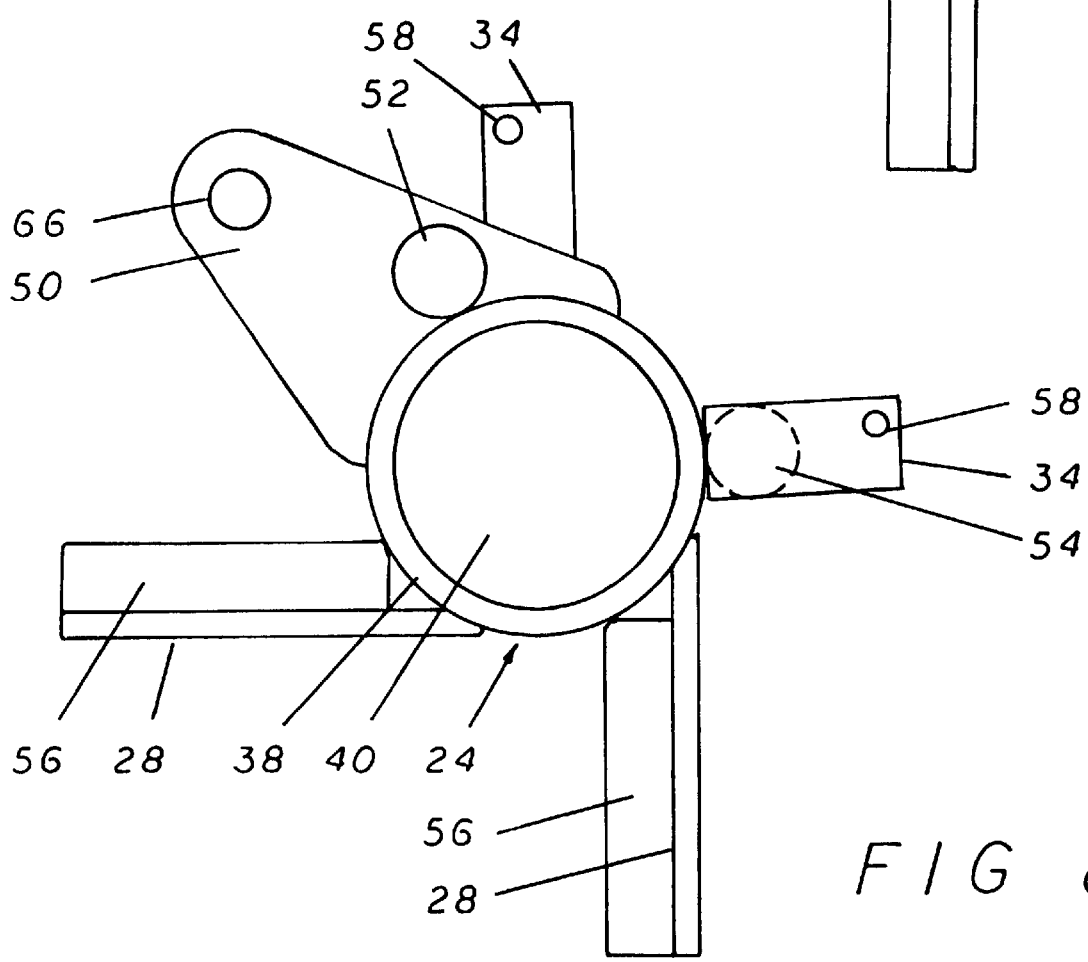
FIG. 8 is side elevation view of the present invention which illustrates the differences between the up and down positions of the drawbar lock flaps.
Figure 9:
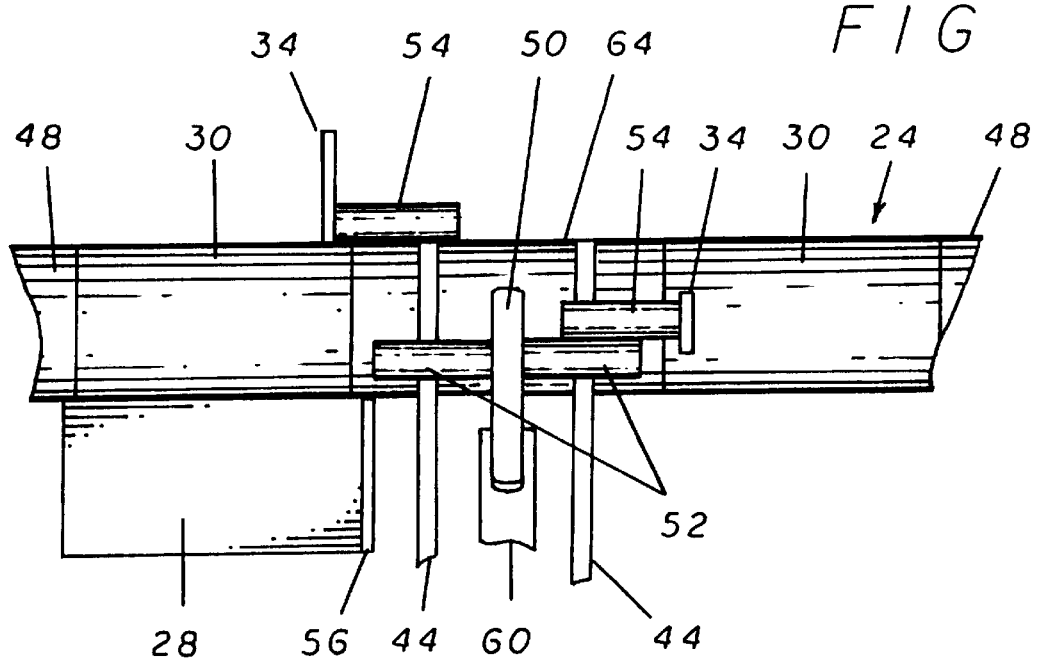
FIG. 9 is a top elevation view of the central portion of the pivot cylinder component of the present invention which illustrates the orientation of the inventions primary components when the drawbar lock flaps are in both the raised and lowered positions.

The manner of construction of the moveable drawbar control system 10 is further illustrated in FIG. 5. As previously stated, the main component of the present invention is the component pivot cylinder 24 which spans the width of the body of the invention. The attachment of the invention to the tractor frame 22 is accomplished through two mechanisms. The first of these is through the use of the attachment flaps 26 located on either end of the component pivot cylinder 24 which attach to integral elements of the tractor frame 22 as previously described.

The second mechanism for invention attachment is through the attachment frame 44 and frame cross members 46. The attachment frame 44 is made up of two rearwardly extending parallel bars which are attached at their forward ends to the component pivot cylinder 24 and along their rearward ends to ridged components of the tractor frame 22. The rearward attachment is also supplemented by the use of the frame cross members 46 which extend perpendicularly from the outer surfaces of each of the two attachment frames 44. The frame cross members 46 also attach to ridged components of the tractor frame 22 which add lateral strength to the attachment frames 44. These attachment features of the present invention ensure that it is securely attached to the tractor frame 22 which enables it to perform its intended functions.

This FIG. also illustrates the positions of the hydraulic cylinder attachment tab 50 which is located between the attachment frames 44 on the component pivot cylinder 24. This attachment is made through the central sleeve 64 which allows the hydraulic cylinder attachment tab 50 to pivot freely on the component pivot cylinder 24. The hydraulic cylinder attachment tab 50 also provides the point of attachment for the cylinder tab lock bars 52 one each of which extend outward from the outer surfaces of the hydraulic cylinder attachment tab 50. It is the cylinder tab lock bars 52 that transfer motion imparted to the hydraulic cylinder attachment tab 50 to the other major components of the invention.

Outside of the point of attachment on the component pivot cylinder 24 for the two attachment frames 44 are located on the lock flap pivot sleeves 30. These lock flap pivot sleeves 30 provide the point of pivotal attachment for the bar lock flaps 28 which are employed to engage and lock a drawbar 12 of a tractor hitch system. Additionally, the lock flap pivot sleeves 30 also provide the point of attachment for the return spring tabs 34, which are perpendicular tabs that extend upward from the surface of the lock flap pivot sleeves 30, which in turn provide the point of attachment for the sleeve return springs 32. The sleeve return springs 32 run from the spring hole 58 on the return spring tabs 34 to a point of attachment on the tractor frame 22 and place a rotational bias on the lock flap pivot sleeves 30 that is transferred to the bar lock flaps 28. This rotational bias forces the bar lock flaps 28 to remain in their down or drawbar 12 engaging position unless they are locked up and out of the way by the action of other invention components.

The return spring tabs 34 also provide the point of attachment on their interior surfaces for the spring tab lock bars 54. The spring tab lock bars 54 are similar in construction to the cylinder tab lock bars 52 and are in fact the component of the invention which the cylinder tab lock bars 52 engage when they are rotated by the movement of the hydraulic cylinder attachment tab 50. Finally, outside of the lock flap pivot sleeves 30 are located the cylinder stationary sleeves 48 which serve to isolate the attachment flap sleeves 38 so that the attachment flaps 26 can operate independently of the rotational aspects of the remaining pivotally mounted components of the present invention.

The manner in which the bar lock flaps 28 are activated by the other components of the present invention is further detailed in FIGS. 6, 7, 8, and 9. The first component involved in the rotation of the bar lock flaps 28 is the activation hydraulic cylinder 36 which fits between the two attachment frames 44 and is attached at its most rearward end to the tractor frame 22 and at its forward end to the cylinder tab hole 66 located on the upper portion of the hydraulic cylinder attachment tab 50. The activation hydraulic cylinder 36 contains a hydraulic cylinder ram 62 the position of which in relation to the body of the activation hydraulic cylinder 36 can be controlled by the tractor operator by hydraulic means. These changes in the relative position of the hydraulic cylinder ram 62 are transferred to the other components of the present invention through the pivotal connection of the hydraulic cylinder pivotal attachment bracket 60 which connects the most forward end of the hydraulic cylinder ram 62 to the cylinder tab hole 66 on the hydraulic cylinder attachment tab 50.

These figures illustrate the manner in which the expansion of the hydraulic cylinder ram 62 forces the hydraulic cylinder attachment tab 50 to pivot forward around the pivot cylinder core 40 of the component pivot cylinder 24. This forward pivoting of the hydraulic cylinder attachment tab 50 also rotates the attached cylinder tab lock bars 52 forward which then contact the spring tab lock bars 54 attached to the return spring tabs 34 and rotate them forward as well. This sequence of events force the lock flap pivot sleeves 30 to rotate and lift the bar lock flaps 28 to their horizontal or disengaged position.

Conversely, if the hydraulic cylinder ram 62 is retracted the hydraulic cylinder attachment tab 50 is pulled rearward which disengages the pressure placed on the spring tab lock bars 54 by the cylinder tab lock bars 52. This allows the load that has been built up in the sleeve return spring 32 through its forced expansion due to component rotation to be released which forces the bar lock flaps 28 and their related components to rotate rearward until they are stopped by the position of the cylinder tab lock bars 52. With the hydraulic cylinder ram 62 in its retracted position, the rotation of the lock flap pivot sleeve 30 is held in check in its forward aspect by the sleeve return spring 32 and in its rearward aspect by the positioning of the cylinder tab lock bars 52.

Figure 10:
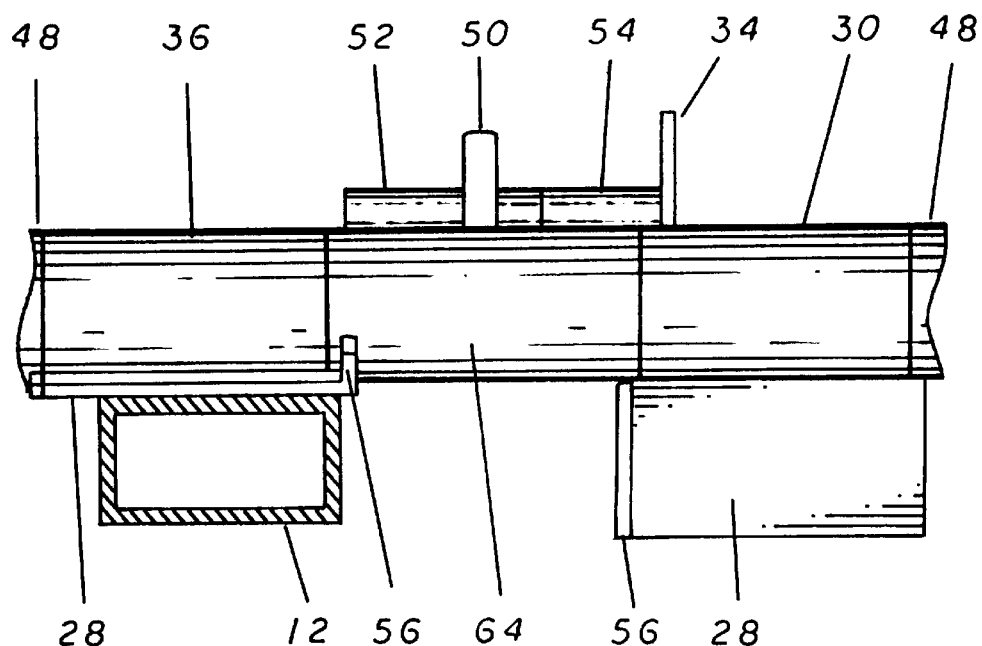
FIG. 10 is a front elevation view of the central portion of the pivot cylinder component of the present invention which illustrates the orientation of the inventions drawbar lock flaps in both the raised and lowered positions when the drawbar is pivoted to one side or the other.
Figure 11:
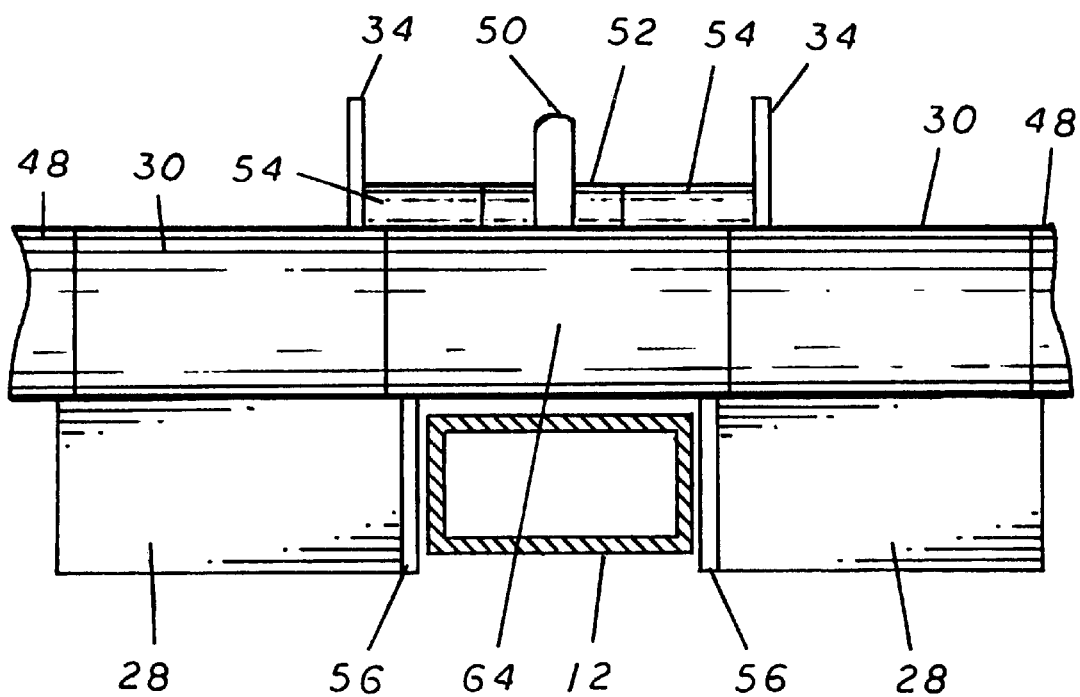
FIG. 11 is a front elevation view of the central portion of the pivot cylinder component of the present invention which illustrates the orientation of the inventions drawbar lock flaps in the lowered position when the drawbar is in the centered position.

The operation of the bar lock flaps 28 in relation to their interaction with a drawbar 12 are further illustrated in FIGS. 10 and 11. To lock a drawbar 12 in a desired position the operator engages the hydraulic system to rotate the lock flap pivot sleeves 30 rearward to drop the bar lock flaps 28 into their vertical or engaged position. The important aspect of this function of the invention is that if the drawbar 12 happens to be in a position that it interferes with the movement of one of the bar lock flaps 28 (as is detailed in FIG. 10), the design of the cylinder tab lock bars 52, the spring tab lock bars 54, and the lock flap pivot sleeves 30 and the manner in which these components interact with the sleeve return spring 32 allow the bar lock flap 28 to remain in its horizontal or disengaged position. Once the drawbar 12 moves free of the bar lock flap 28 the bias in the sleeve return spring 32 forces the bar lock flap 28 down into its vertical or engaged position. This design of these key components of the present invention allows the operator to engage the system without regard for the position of the drawbar 12 with respect to the bar lock flaps 28. This is possible as the invention automatically compensates for a drawbar 12 that is out of position until that position is obtained. Once this occurs, the bar lock flap 28 automatically locks the drawbar 12 in the correct position.

Finally, the inner edge of the bar lock flaps 28 are also equipped with lock flap engagement surfaces 56 which are a curled and extended edge of the bar lock flaps 28 that provide a larger and stronger surface which is used to hold the drawbar 12 in the desired position. This design of the bar lock flaps 28 ensures that they are strong enough to withstand the forces placed on them by a drawbar 12 which is being used to pull an implement behind a caterpillar tractor.

Although the present invention has been described in considerable detail with reference to certain preferred versions thereof, other versions are possible. Therefore, the spirit and scope of the appended claims should not be limited to the description of the preferred versions contained herein.

What is claimed is:

1. A drawbar control system for use on an industrial vehicle having an elongate drawbar with a first end pivotally attached to said vehicle and a second end defining an implement attachment point, said drawbar control system comprising:

an elongate core;

a left drawbar flap pivotally connected to said elongate core between a lock and a slide position;

a right drawbar flap pivotally connected to said elongate core between a lock and a slide position;

a means for biasing said left and right drawbar flaps in a lock position; and a control means for moving said left and right drawbar flaps against said means for biasing into a slide position.

2. A drawbar control system as in claim 1 wherein said control means is a hydraulic cylinder selectively movable between an extended and retracted position.

3. A drawbar control system as in claim 2 wherein said biasing means is a left and right spring for biasing said left and right drawbar flaps.

4. A drawbar control system as in claim 3 wherein said left and right drawbar flaps pivots independently on said elongate core.

5. A drawbar control system as in claim 4 further comprising an attachment tab on said hydraulic cylinder for controlling said left and right drawbar flaps.

6. A drawbar control system as in claim 5 further comprising an engagement surface on said left and right flaps for holding said drawbar in a fixed position when said left and right drawbar flaps are in a lock position.

7. A drawbar control system for use on an industrial vehicle having an elongate drawbar with a first end pivotally attached to said vehicle and a second end defining an implement attachment point, said drawbar control system comprising:

an elongate core;

a left drawbar flap pivotally connected to said elongate core between a lock and a slide position;

a right drawbar flap pivotally connected to said elongate core between a lock and a slide position;

a spring section for biasing said left and right drawbar flaps in a lock position; and a drive cylinder for moving said left and right drawbar flaps against said spring section.

8. A drawbar control system as in claim 7 wherein said drive cylinder is a hydraulic cylinder selectively movable between an extended and retracted position.

9. A drawbar control system as in claim 8 wherein said spring section is a left and right spring for biasing said left and right drawbar flaps independently.

10. A drawbar control system as in claim 9 wherein said left and right drawbar flaps pivot independently on said elongate core.

11. A drawbar control system as in claim 10 further comprising an attachment tab on said hydraulic cylinder for controlling said left and right drawbar flaps.

12. A drawbar control system as in claim 11 further comprising an engagement surface on said left and right flaps for holding said drawbar in a fixed position when said left and right drawbar flaps are in a lock position.

13. A hitch and control system for use on an industrial vehicle said system comprising:

an elongate drawbar having a first end pivotally connected to said vehicle and a second end defining an implement attachment point such that drawbar may pivot in a horizontal plane;

an elongate core;

a left drawbar flap pivotally connected to said elongate core such that said left drawbar flap is pivotal between a downward lock position and an upward slide position;

a right drawbar flap pivotally connected to said elongate core such that said right drawbar flap is pivotal between a downward lock position and an upward slide position;

a spring section for biasing said left and right drawbar flaps in a lock position; and a drive cylinder for moving said left and right drawbar flaps against said spring section.

14. A hitch and control system as in claim 13 wherein said drive cylinder is a hydraulic cylinder selectively movable between an extended and retracted position.

15. A hitch and control system as in claim 14 wherein when said left and right drawbar flaps are in a lock position they hold said drawbar in a centered position.

16. A hitch and control system as in claim 15 wherein said spring section is a left and right spring for biasing said left and right drawbar flaps independently.

17. A hitch and control system as in claim 16 wherein said left and right drawbar flaps pivots independently on said elongate core.

18. A hitch and control system as in claim 17 further comprising an attachment tab on said hydraulic cylinder for controlling said left and right drawbar flaps.

19. A hitch and control system as in claim 18 further comprising an engagement surface on said left and right flaps for holding said drawbar in a fixed position when said left and right drawbar flaps are in a lock position.

* * * * *